United States Patent [19]

Guzman et al.

[11] B 3,914,631

[45] Oct. 21, 1975

[54] CAPSTAN MOTOR HAVING A CERAMIC OUTPUT SHAFT AND AN ADHESIVELY ATTACHED CAPSTAN

[75] Inventors: Adolfo M. Guzman, Boulder, Colo.; Harlan D. Lawes, San Jose, Calif.

[73] Assignee: International Business Machines Corporation, Armonk, N.Y.

[22] Filed: Aug. 17, 1973

[21] Appl. No.: 389,295

[44] Published under the Trial Voluntary Protest Program on January 28, 1975 as document no. B 389,295.

[52] U.S. Cl. ........................ 310/75; 226/30; 226/42

[51] Int. Cl. ........................ H02K 7/10

[58] Field of Search ............ 310/51, 75, 75 C, 75 D, 310/46, 171, 266, 154, 113; 64/1 V; 226/30, 31, 42, 45, 188

[56] References Cited

UNITED STATES PATENTS

| | | | |
|---|---|---|---|
| 3,102,964 | 9/1963 | Bennett | 310/154 |
| 3,209,187 | 9/1965 | Angele | 310/154 |
| 3,326,440 | 6/1971 | Barnes | 226/188 |
| 3,335,309 | 8/1967 | Hansen | 310/266 |
| 3,418,505 | 12/1968 | Mihalko | 310/266 |
| 3,429,494 | 2/1969 | Chang | 226/42 |
| 3,490,672 | 1/1970 | Fisher | 310/75 |
| 3,588,556 | 6/1971 | Guzman | 310/266 |
| 3,678,313 | 7/1972 | Parker | 226/188 |

*Primary Examiner*—R. Skudy

[57] ABSTRACT

A permanent magnet, direct current capstan motor for use in moving magnetic recording tape in a start/stop mode at a high repetition rate, wherein a lightweight motor armature is shaft-connected to a tape drive capstan by means of a nonmetallic, ceramic, monocrystalline aluminum oxide shaft. The capstan is adhesively attached to one end of the ceramic shaft. The shaft performs the multifunctions of maintaining a high mechanical resonant frequency for the motor's rotating assembly, magnetically isolating the magnetic recording tape from the motor's magnetic field, and heat insulating the capstan's adhesive interface to the shaft from the heat source formed by the motor's armature.

8 Claims, 3 Drawing Figures

CAPSTAN MOTOR HAVING A CERAMIC OUTPUT SHAFT AND AN ADHESIVELY ATTACHED CAPSTAN

BACKGROUND AND SUMMARY OF THE INVENTION

This invention is related to the field of electrical motor structure, and more specifically to rotary dynamo-electric machines of the high torque — low inertia type incorporating vibration suppression means.

Prior rotary motors have resorted to various means for damping oscillations set up in the motor's rotating structure. Generally, these means add considerably to the mass of the motor's rotating assembly and are satisfactory for conventional motors since the ability of the motor to quickly accelerate and decelerate is a critical factor only in the art of high torque — low inertia motors.

A well known use of a high torque — low inertia motor is as the capstan motor of a digital magnetic tape unit. Such a motor normally includes a lightweight armature which is connected directly to a tape drive capstan. Magnetic recording tape is continuously held against the capstan's tape driving surface such that armature rotation is immediately translated into tape motion. The data format on tape includes short interblock gaps (IBG) which separate adjacent blocks of data. The capstan motor is usually decelerated to a stop such that an associated magnetic head is positioned in the IBG. When a start command is received, it is necessary for the capstan motor to accelerate the tape from a rest condition to a high linear speed of, for example, 200 inches per second, while moving the tape only a few tenths of an inch. This high tape speed is then accurately maintained while the head traverses the data block. Subsequently, when a stop command is received, the tape must be quickly brought to rest, while again moving only a few tenths of an inch. In addition, it is not unusual for the capstan motor commands to effect start/stop cycles at the rate of four hundred or so per second.

This unusual operating environment requires a motor with a high mechanical resonant frequency, many times higher than the response frequency of the associated closed-loop speed servomechanism which is controlling these states of motor movement. Prior art attempts to stiffen the motor's rotating assembly results in an increase in the inertia of the assembly, and increased difficulty in designing a servo to achieve the required acceleration and deceleration.

The present invention solves these problems in a simple and unusual manner. Specifically, the present invention uses a short ceramic motor shaft to connect the motor armature to the tape drive capstan. This ceramic material is selected for its torsional stiffness, thus achieving the desired high mechanical resonant frequency. The length of the shaft is maintained as short as practical to also maximize this resonant frequency.

This ceramic material has been used heretofore in linear actuators, where the ceramic material was placed under tension or compression between a load and an armature. The present invention and the use of the ceramic material in a torsional mode between a capstan and an armature produces an unusually superior capstan motor.

One would suspect that the close spacing of the capstan to the armature might produce the undesirable effect of subjecting the magnetic tape to the motor's magnetic field. However, the use of a ceramic shaft, and its high magnetic reluctance properties, insures that the motor's magnetic field does not follow the shaft and thereby leak out to the capstan where the tape's magnet domains, representing binary data, can be disturbed.

Yet another unusual and unexpected result is achieved by the use of this ceramic shaft. As one would expect, an armature operating at a high start/stop cycle rate will generate an unusual amount of heat. The use of a ceramic shaft, and its heat insulation properties, insures that heat generated at the armature does not follow the shaft and thereby unduly heat the capstan and the tape. The use of a ceramic shaft then allows the capstan to be attached to the shaft by the simple inexpensive expedient of an adhesive. While special purpose adhesives are designed to operate in a high temperature environment, most deteriorate to at least some extent with temperature. The present invention minimizes this temperature.

The foregoing and other features and advantages of the invention will be apparent from the following more particular description of a preferred embodiment of the invention, as illustrated in the accompanying drawing.

DESCRIPTION OF THE PREFERRED EMBODIMENT

Figure 1:
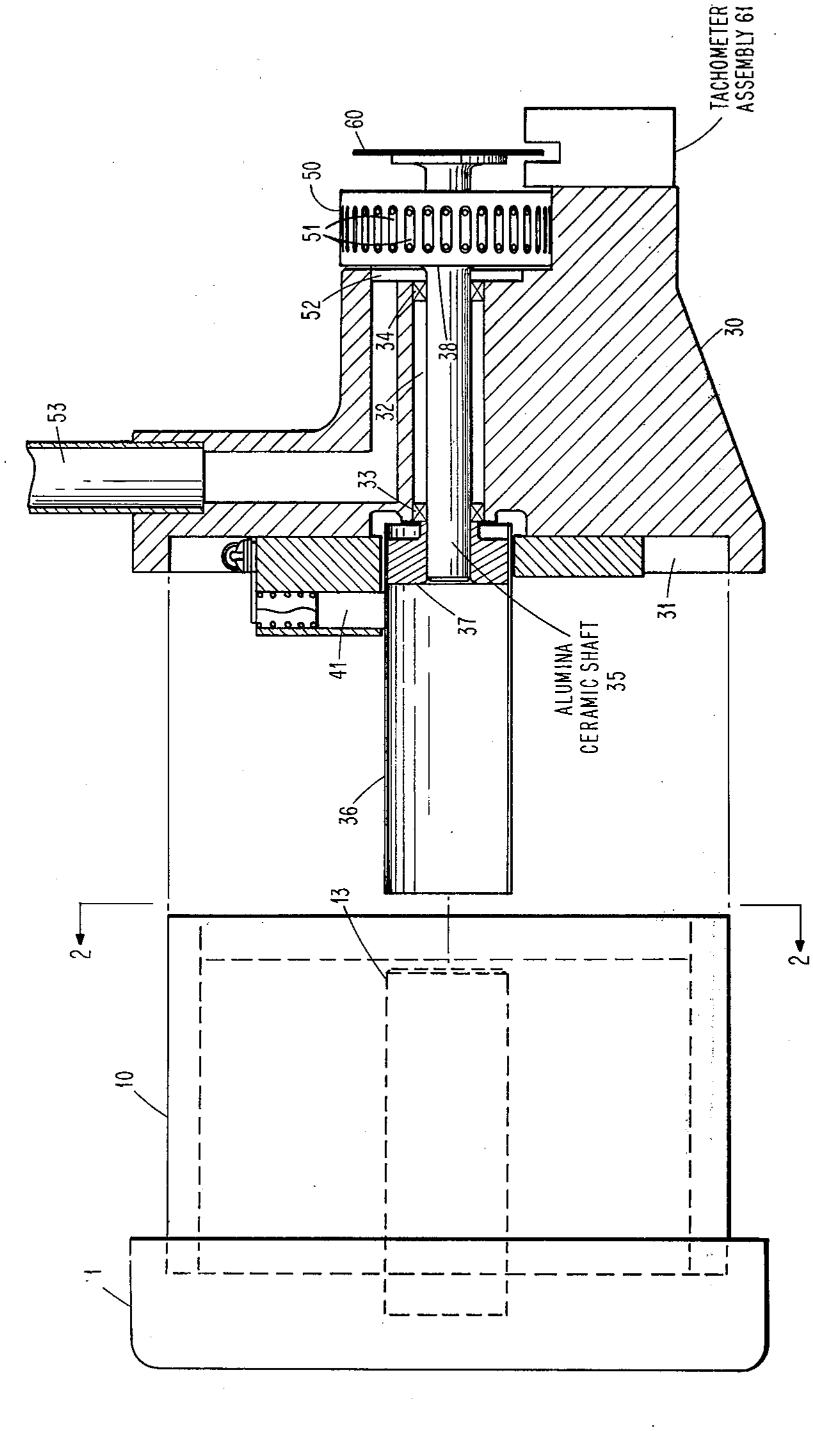
FIG. 1 is a view of a permanent magnet direct current motor incorporating the present invention, wherein the front aluminum end bell is broken away to show the motor's rotating assembly.

The motor housing, as shown in FIG. 1, consists essentially of a tubular member 10 formed of low carbon steel. This member is magnetically permeable and forms a portion of the magnetic flux path for the motor, as will be apparent from a consideration of FIG. 2. One end of the motor is closed by aluminum end bell 11. A magnetically permeable flux return post 13 is cantilevered supported by end bell 11 and is mounted concentric with the rotational axis 14 of the motor, as seen in FIG. 2.

Shaft mounted capstan motors of this general type, having a tubular armature, externally disposed permanent magnets, and a shaft mounted capstan are described in the IBM TECHNICAL DISCLOSURE BULLETINS of November 1971 at pages 1750–51, August 1972 at pages 1029–30, and May 1973 at pages 3776–77.

Figure 2:
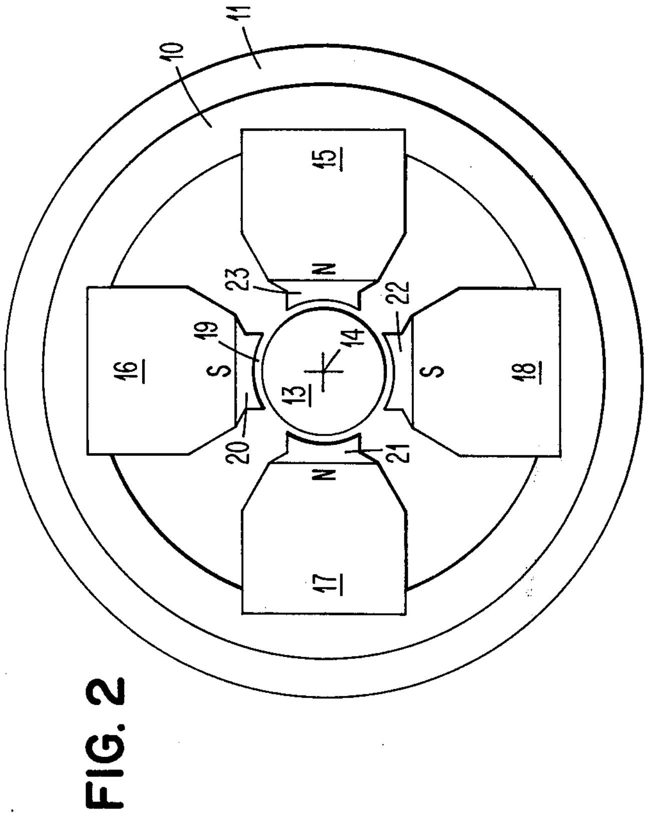
FIG. 2 is a view of the motor's magnetic flux producing assembly, taken along the line 2—2 of FIG. 1.

With reference to FIG. 2, four permanent magnets 15, 16, 17 and 18 are disposed at 90° intervals about the inner diameter of housing member 10. These magnets produce a radially extending field and present magnetic poles of alternating polarity about the circumference of annular air gap 19, formed by post 13 and pole pieces 20, 21, 22 and 23 affixed to the end of the magnets. Considering the magnetic flux path for magnet 17, by way of example, the flux leaves pole piece 21, crosses air gap 19 and enters post 13. The flux then divides and again crosses the air gap, entering pole pieces 20 and 22. The flux path can then be traced through magnets 16 and 18, respectively, to housing member 10, where the flux returns to the south pole of magnet 17.

The motor's housing is completed by a second aluminum end bell 30, FIG. 1. This end bell includes an annular cavity 31 which internally receives a portion of tubular housing member 10, to thus form an integral motor structure.

Figure 3:
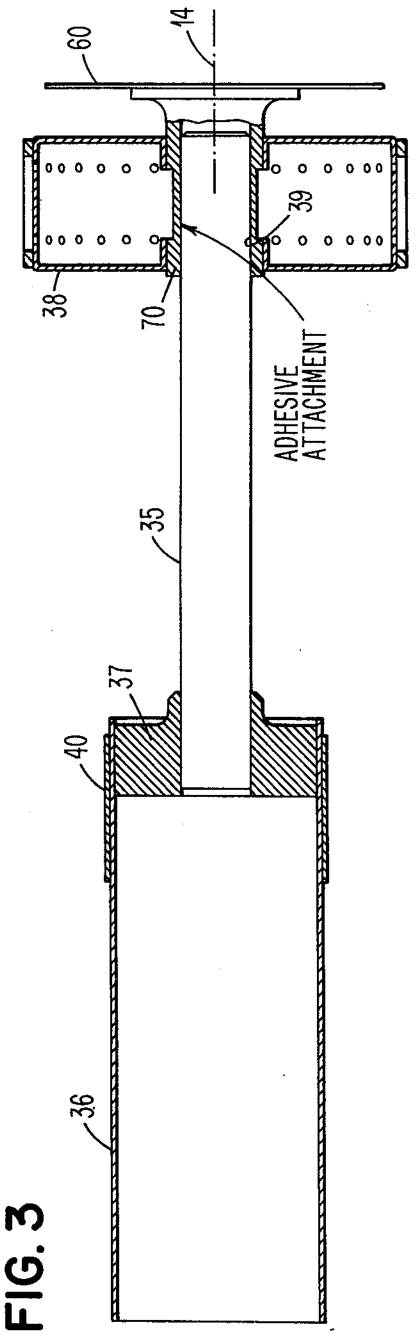
FIG. 3 is an enlarged view of the motor's rotating assembly.

End bell 30 includes a centrally disposed bore 32. The motor's rotating assembly is supported in this bore by ball bearings 33 and 34. Referring to FIG. 3, the motor's rotating assembly includes a high purity alumina ceramic shaft 35. The motor's tubular armature 36 is cantilever supported by one end of shaft 35, by means of an electrically nonconductive hub 37 which is press fit onto one end of shaft 35. A tape drive capstan 38 is adhesively attached to the other end of the shaft by means of tubular interface 39.

Capstan 38 is preferably formed of a plastic or lightweight metal, and may have a tapered wall structure, to maximize torsional and axial rigidity, such as described in the IBM TECHNICAL DISCLOSURE BULLETIN of June 1973 at pages 267–8. As previously mentioned, it is possible to adhesively attach capstan 38 to shaft 35 because of the unique heat insulating properties of this shaft. The term adhesively attached is intended to mean the attachment of capstan 38 to shaft 35 by a glue or cement. An example of an acceptable material is the two-part epoxy base adhesive EC1838B/A, manufactured by the Minnesota Mining and Manufacturing Company.

Shaft 35, in an exemplary embodiment of the present invention, had a length of 2.8 inches, a diameter of 0.3 inch and was formed of 99 percent alumina ceramic. As used herein, the term ceramic motor shaft is intended to specifically mean a shaft formed from high purity (99 percent or higher) polycrystalline aluminum oxide (A1203 alumina ceramic). Generically, the term ceramic motor shaft is intended to mean a shaft formed of a nonmetallic crystalline refractory material that combines high mechanical strength and high torsional modulus with extreme hardness, inertness, refractoriness, high chemical resistance and excellent electrical insulation properties. These materials are known as technical ceramics having high oxide content, of which beryllia ceramic is a further specific example. A specific property of this material, which contributes to the unusual characteristics of the present capstan motor is its torsional stiffness to weight ratio, that is, G/P (torsional modulus/density) (PSI/pounds per cubic inch). By way of example, a more conventional steel motor shaft has such a ratio approximately equal to $40 \times 10^6$ whereas the present alumina ceramic shaft has a similar ratio approximately equal to $150 \times 10^6$. The higher this ratio, the higher will be the mechanical resonant frequency of the motor's rotating assembly. The term torsional stiffness, as used above, is generally equated with and related to the terms modulus of elasticity and torsional modulus. A ceramic material selected to accomplish the present invention should have high torsional stiffness, high modulus of elasticity and high torsional modulus.

By way of example, a motor constructed in accordance with the present invention achieves a mechanical resonant frequency of approximately 6,200 cycles per second. A high response electronic speed servomechanism, used to control the speed of the motor's rotating assembly by way of closed-loop servo techniques has an exemplary frequency response of approximately 4,000 cycles per second. Thus, as is desirable, the motor's mechanical resonant frequency is well above the servomechanism response frequency.

Armature 36 is a lightweight, nonferrous armature and may, for example, be manufactured in accordance with the teachings of U.S. Pat. No. 3,650,021 by K. N. Karol. The end of armature 36 which is associated with hub 37 carries an annular commutating track 40 (FIG. 3) which cooperates with a number of brushes 41 mounted on end bell 30, as shown in FIG. 1. It is desirable, in order to satisfy the high acceleration and deceleration rates associated with short interblock gaps on magnetic tape, that the electrical conductors of armature 36 be formed of aluminum. In this case, commutator segments are formed on the aluminum conductors, to thereby form commutation track 40, for example, as disclosed in co-pending application Ser. No. 173,171, filed Aug. 19, 1971 by P. Y. Hu et al., commonly assigned.

Armature 36, when operating in the environment required by the accurate positioning of magnetic tape adjacent a magnetic head, and particularly when the tape must be accelerated from rest to a linear speed often in excess of 200 inches per second, becomes a heat source which is preferably cooled, by means not shown, by forced air as described in U.S. Pat. No. 3,588,556 by A. M. Guzman et al.

With reference to FIG. 1, the capstan's tape driving interface 50 includes a pattern of openings 51 which communicate with the internal circumference of the capstan. This internal capstan area is connected to vacuum plenum 52 which is in turn connected to a source of vacuum by conduit 53, thereby insuring that the tape being moved by interface 50 does not slip as it is being accelerated and decelerated.

Ceramic shaft 35 allows capstan 50 to be axially removed from armature 36 and the motor's magnets 15–18 without lowering the motor's mechanical resonant frequency. Normally, shaft mounting of capstan 50 to armature 36 would lower the motor's resonant frequency. However, the high torsional modulus (torsional stiffness) of shaft 35 allows this axial placement while maintaining a high motor resonant frequency. Furthermore, ceramic shaft 35, being magnetically nonpermeable, insures that stray magnetic flux from magnets 15–18 will not follow the shaft out to the tape driving interface 50 of the capstan. Such stray flux may, if intense enough, interfere with the tape's magnetic domains and thus interfere with the ability of an associated head to transduce the tape's data. In addition, ceramic shaft 35 is a heat insulator and the heat generated at armature 36 does not follow the shaft to the attachment interface with capstan 38. As a result, capstan 38 can be attached to shaft 35 by means of the inexpensive and convenient expedient of adhesive attachment, a temperature sensitive tachometer disc 60 can be used, and the magnetic recording tape adjacent the capstan's driving surface is not subjected to a high temperature environment.

The rotational speed of capstan 38 is sensed by a digital tachometer having a see-thru optical disc 60 whose outer circumference carries an optical pattern of alternating opaque and transparent sections. This optical pattern passes through a tachometer assembly 61 where a light/photocell couple is interrupted as the disc moves. The frequency of the photocell output is a measure of capstan speed. This photocell output is used to servo control the energization of the capstan motor.

As seen in FIG. 3, capstan 38 and disc 60 are mounted on a metal sleeve 70. These parts then comprise a subassembly which is mounted on shaft 35 by way of adhesive attachment interface 39 between sleeve 70 and the shaft.

Disc 60 is preferably formed of a lightweight material such as a polyester base film. While this material adds little to the inertia of the motor's rotating assembly, it is heat sensitive and tends to warp or distort at a temperature in the range of 150°F. The use of alumina ceramic shaft 35, and its heat insulating properties, additionally isolates this disc from the heat source represented by armature 36.

While the invention has been particularly shown and described with reference to a preferred embodiment thereof, it will be understood by those skilled in the art that various changes in form and details may be made therein without departing from the spirit and scope of the invention.

What is claimed is:

1. A high torque — low inertia tape drive capstan motor, comprising:

a stationary magnetic field structure providing an air gap, a rotatable armature positioned to rotate within said air gap, a ceramic shaft connected to be driven by said armature by having one end thereof attached to the center of rotation of said armature, and a tape drive capstan adhesively attached to the other end of said shaft in close physical proximity to said armature and said magnetic field structure, the heat insulation and magnetic reluctance properties of said shaft functioning to isolate said capstan and its adhesive interface from temperature rise and magnetic field induced by motor operation.

2. The motor defined in claim 1 wherein said shaft is formed of a technical ceramic.

3. The motor defined in claim 2 wherein said shaft is formed of high purity polycrystalline aluminum oxide.

4. The motor defined in claim 2 wherein said armature is a hollow tubular armature which is cantilever supported at one end only by a hub which mechanically connects said armature to said shaft, and wherein said magnetic field structure includes a flux return rod member positioned within said armature and a plurality of permanent magnets disposed about the outside periphery of said armature.

5. The motor defined in claim 4 including:

a magnetically permeable housing supporting said magnets, and a magnetically nonpermeable end bell including bearing means rotatably supporting said shaft.

6. The motor defined in claim 5 including a movable, temperature sensitive, tachometer disc connected to rotate with said capstan and a stationary tachometer assembly cooperating with said disc and mounted on said end bell.

7. The motor defined in claim 6 wherein said capstan and said disc are mounted on a metal sleeve to thus form a subassembly, and wherein said subassembly is attached to said other end of said shaft by an adhesive interface between said sleeve and said shaft.

8. The motor defined in claim 7 wherein said shaft is formed of high purity polycrystalline aluminum oxide.

* * * * *